(12) United States Patent
Whitelaw

(10) Patent No.: US 8,851,837 B2
(45) Date of Patent: Oct. 7, 2014

(54) APPARATUS AND METHOD FOR ENERGY EXTRACTION

(76) Inventor: Matthew Whitelaw, Aberdeen (GB)

( * ) Notice: Subject to any disclaimer, the term of this patent is extended or adjusted under 35 U.S.C. 154(b) by 514 days.

(21) Appl. No.: 13/054,163

(22) PCT Filed: Jul. 16, 2009

(86) PCT No.: PCT/GB2009/050871
§ 371 (c)(1),
(2), (4) Date: Jan. 14, 2011

(87) PCT Pub. No.: WO2010/007437
PCT Pub. Date: Jan. 21, 2010

(65) Prior Publication Data
US 2011/0116925 A1    May 19, 2011

(30) Foreign Application Priority Data

Jul. 16, 2008 (GB) .................................. 0812937.1
Aug. 15, 2008 (GB) .................................. 0814911.4
Sep. 12, 2008 (GB) .................................. 0816713.2

(51) Int. Cl.
*F03B 13/16* (2006.01)
*F03B 13/26* (2006.01)

(52) U.S. Cl.
CPC ........... *F03B 13/262* (2013.01); *F05C 2225/00* (2013.01); *Y02E 10/38* (2013.01); *F05B 2240/97* (2013.01); *F05B 2280/4003* (2013.01); *Y02E 10/28* (2013.01); *F05B 2240/40* (2013.01); *F05B 2250/60* (2013.01); *F05B 2260/4031* (2013.01); *Y10S 416/04* (2013.01)
USPC ......................................... 416/1; 416/DIG. 4

(58) Field of Classification Search
CPC ........ F03B 13/262; F03B 13/16; F03B 13/26; F05B 2240/40; F05B 2240/97; F05B 2250/60; F05B 2280/4003; F05B 2260/4031; F05C 2225/00; Y02E 10/28

USPC ............ 416/1; 415/3.1, 4.1, 5, 7, 2.1; 244/42, 244/53; 60/495–496
See application file for complete search history.

(56) References Cited

U.S. PATENT DOCUMENTS 4,124,182 A * 11/1978 Loeb ......................... 244/153 R
4,350,474 A * 9/1982 Murphy ............................ 416/7
(Continued)

FOREIGN PATENT DOCUMENTS

DE        2555120 A1    6/1976
DE        4138601 A1    5/1993
(Continued)

OTHER PUBLICATIONS

International Search Report and Written Opinion dated Oct. 21, 2010 from PCT Patent Application No. PCT/GB2009/050871 filed Jul. 16, 2009 (11 pages).

(Continued)

*Primary Examiner* — Edward Look
*Assistant Examiner* — Eldon Brockman
(74) *Attorney, Agent, or Firm* — Workman Nydegger

(57) ABSTRACT

An apparatus and method for extracting energy for a tidal stream in a body of the water are described. The apparatus comprises a body located in a tidal stream, a generator; and a line coupled to the generator such that relative movement between the line and the generator drives the generator. In one configuration, the body comprises a drag surface oriented substantially in the direction of the tidal stream and has at least one formation for promoting a drag force on the body. The drag force causes movement of the body with the tidal stream, which results in relative movement of the line and generator to drive the generator.

29 Claims, 10 Drawing Sheets

(56) References Cited

U.S. PATENT DOCUMENTS

| | | | |
|---|---|---|---|
| 4,859,146 A * | 8/1989 | Labrador | 416/8 |
| 6,476,511 B1 * | 11/2002 | Yemm et al. | 290/42 |
| 7,188,808 B1 * | 3/2007 | Olson | 244/153 R |
| 2002/0033019 A1 * | 3/2002 | Mizzi | 60/398 |
| 2002/0056995 A1 * | 5/2002 | Saiz | 290/55 |
| 2002/0131824 A1 * | 9/2002 | Sanchez Gomez | 405/76 |
| 2003/0066934 A1 * | 4/2003 | Bolonkin | 244/153 R |
| 2005/0121915 A1 * | 6/2005 | Leijon et al. | 290/42 |
| 2007/0095061 A1 * | 5/2007 | Borgesen | 60/495 |
| 2008/0007069 A1 * | 1/2008 | Diederich | 290/55 |
| 2008/0258465 A1 * | 10/2008 | Johnston | 290/53 |

FOREIGN PATENT DOCUMENTS

| | | | | |
|---|---|---|---|---|
| WO | 2005054669 A1 | 6/2005 | | |
| WO | 2007031800 A1 | 3/2007 | | |
| WO | WO 2007139412 A1 * | 12/2007 | | F03D 5/00 |

OTHER PUBLICATIONS

International Preliminary Report on Patentability dated Jan. 18, 2011 from PCT Patent Application No. PCT/GB2009/050871 filed Jul. 16, 2009 (8 pages).

* cited by examiner

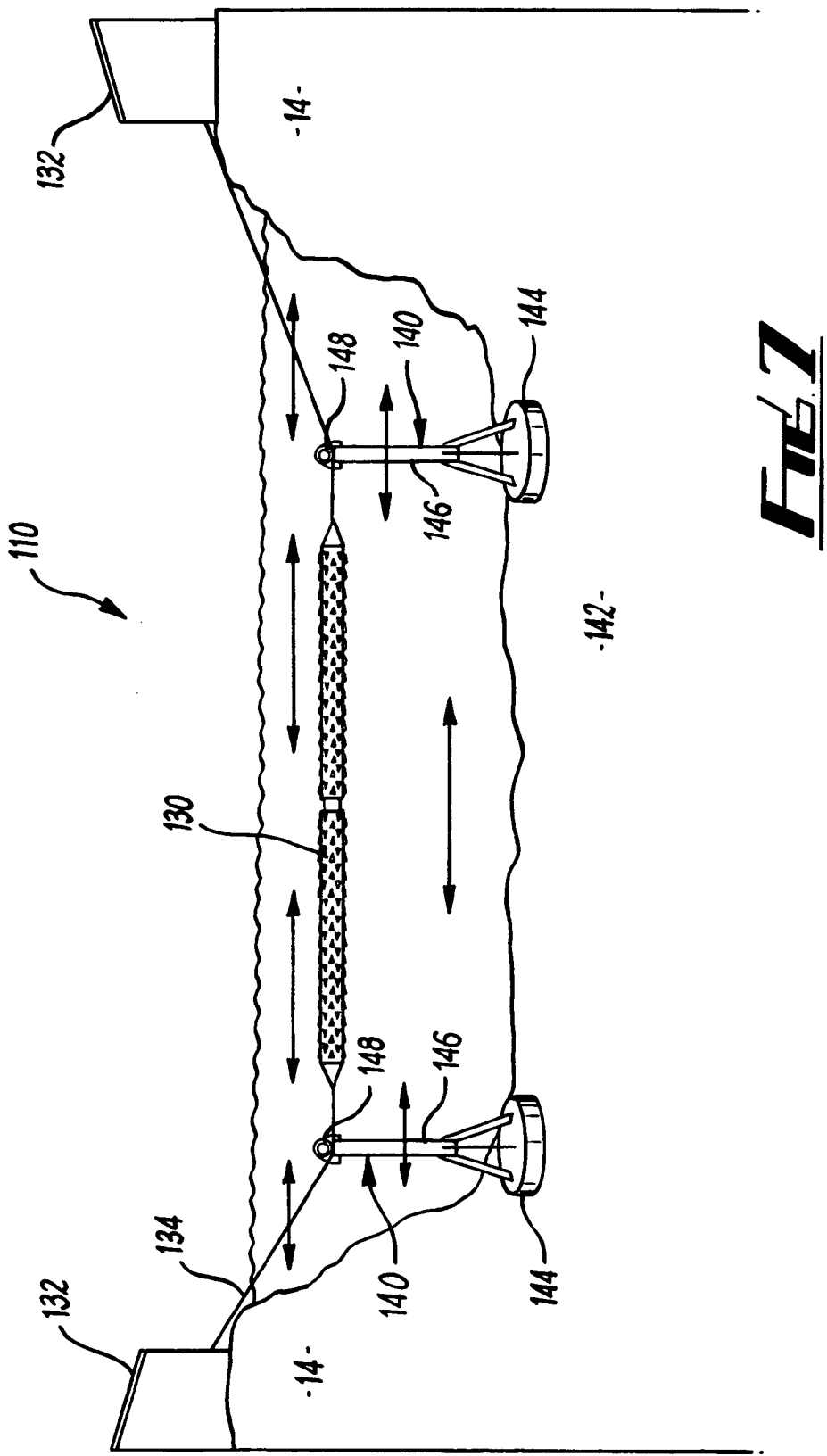

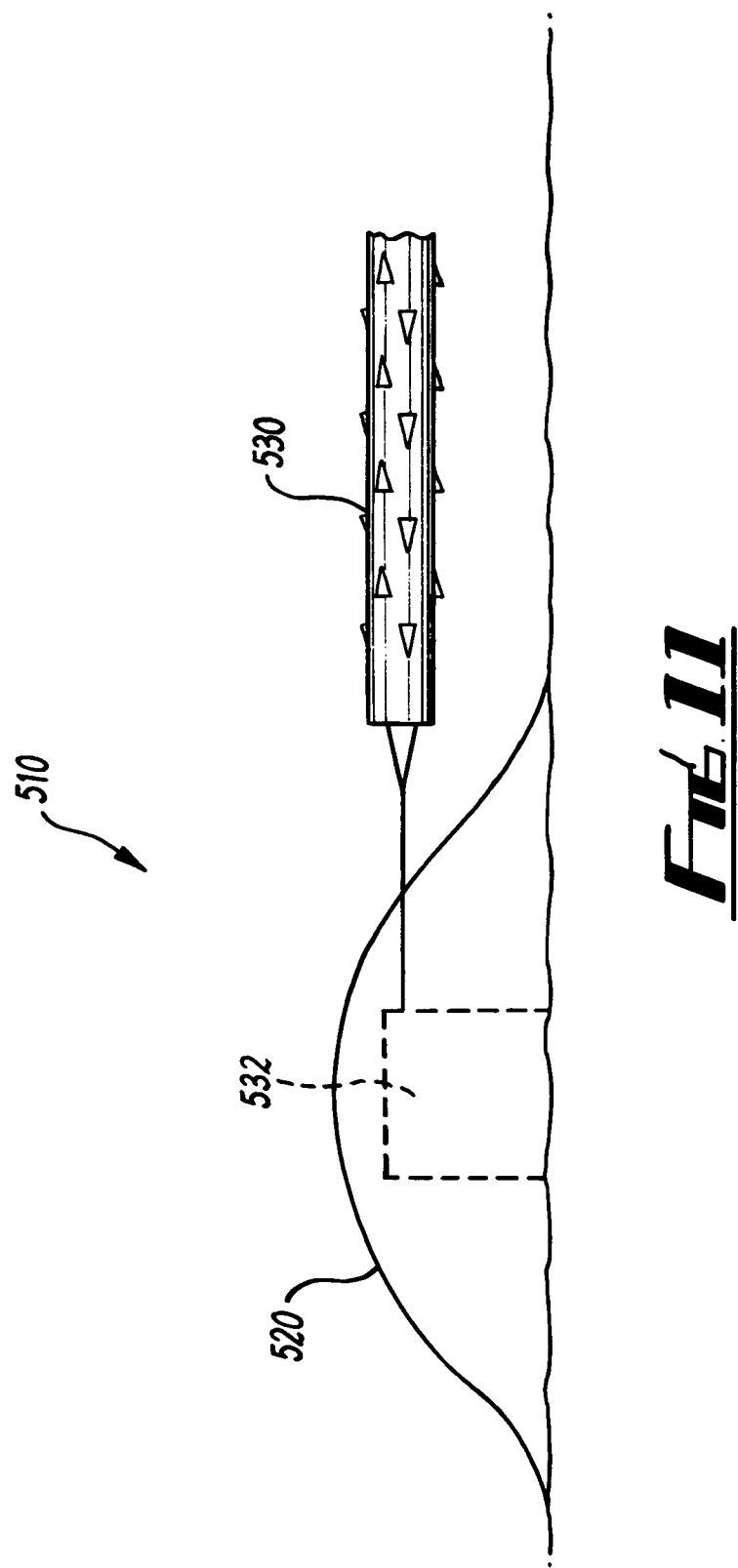

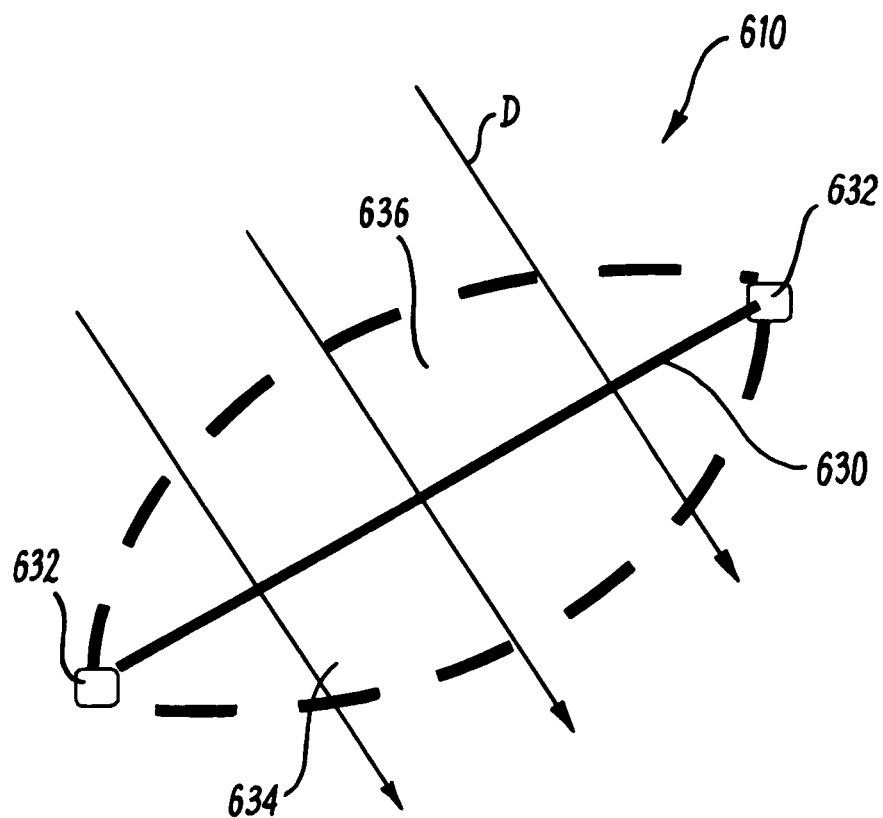

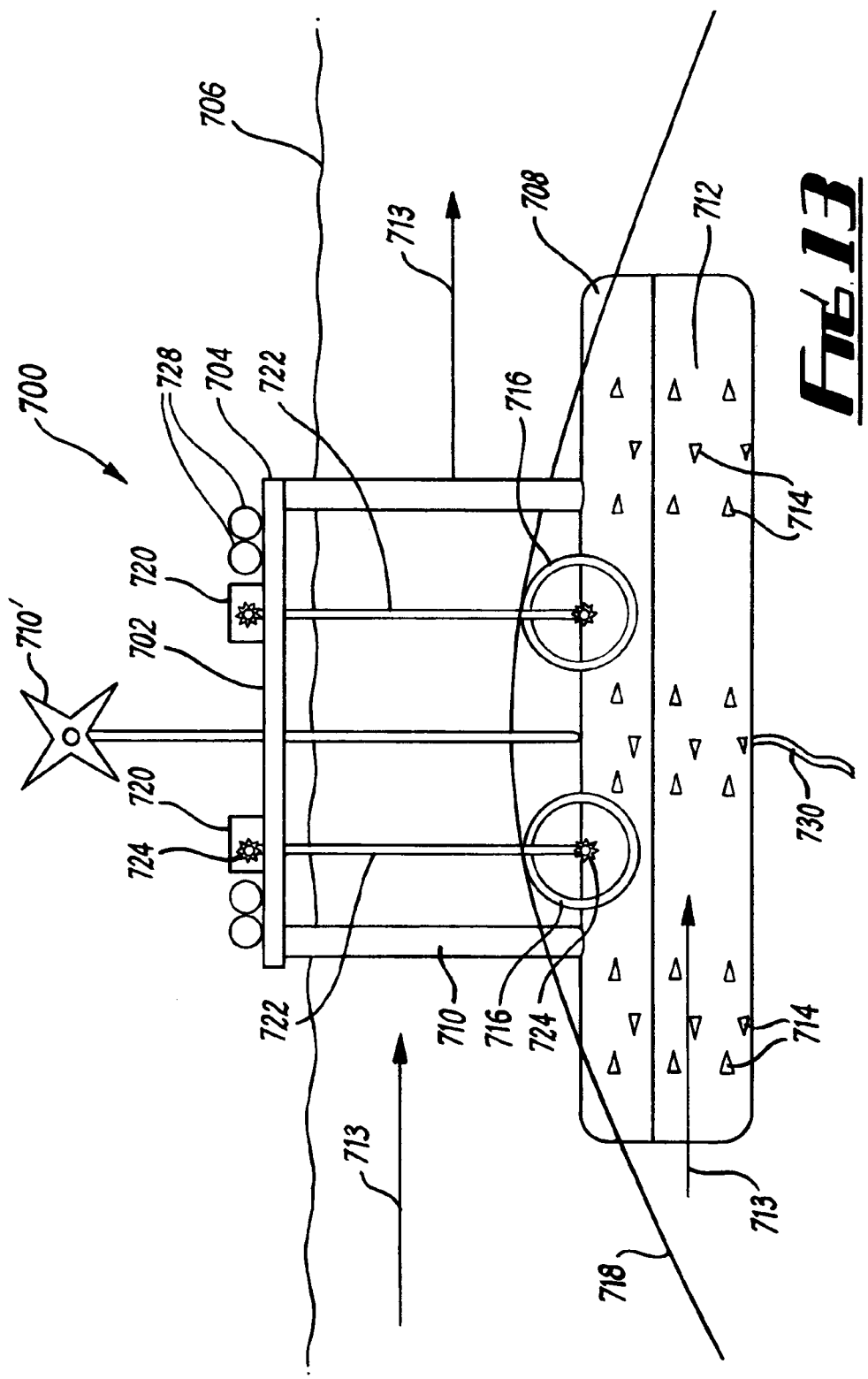

APPARATUS AND METHOD FOR ENERGY EXTRACTION

The present invention relates to an apparatus and method for energy extraction from a flowing stream in a body of water. In particular, the invention relates to a method and apparatus for use in a tidal stream. One embodiment of the invention relates to a controlled buoyant line deployed in a tidal stream path in order to exert tidal energy on the line which is conveyed along the line and used as mechanical energy to drive a generator.

Energy extraction systems which use kinetic energy of moving water in a flowing stream, such as a tidal stream, to drive turbines are known. Typically a tidal stream energy extraction system will be located in an area with a fast flowing stream, for example where fluid flows between naturally formed obstructions. It has recently been proposed to use shrouded tidal energy turbines, which can provide increased power output in shallower and slower moving water with smaller turbines. However, most shrouded turbines are directional and may not capture flow efficiently. It is also necessary for them to be located below the mean low water level of the body of the water. In addition, shrouded turbines are subjected to high loads, and require a robust mounting system. Shrouded turbines also pose a threat to marine life, which can get drawn into the turbine blades.

Barrage tidal power systems generate energy from the potential energy and the changes to the hydrostatic head between the high tide and a low tide have also been proposed. A barrage energy extraction system requires significant civil engineering and high capital expenditure. Barrage systems also have a high environmental impact, and can be applied only to a limited number of sites around the world.

It would be desirable to produce an energy extraction system for tidal streams which has low environmental impact, is simple to manufacture and deploy, requires little supporting infrastructure, and which can be installed in a variety of subsea locations.

It is one aim of the invention to provide a method and apparatus for extracting energy from a tidal stream that mitigates the drawbacks and efficiencies of previously proposed tidal stream energy extraction systems. Other aims and objects of the invention will become apparent from reading the following description.

According to a first aspect of the invention, there is provided apparatus for extracting energy from a tidal stream in a body of water, the apparatus comprising a body located in a tidal stream; a generator; and a line coupled to the generator such that relative movement between the line and the generator drives the generator; wherein the body comprises a drag surface oriented substantially in the direction of the tidal stream and comprising at least one formation for promoting a drag force on the body to cause movement of the body with the tidal stream, and wherein such movement of the body causes relative movement of the line and generator to drive the generator.

The body of the apparatus may be referred to as a drag body.

According to a second aspect of the invention, there is provided apparatus for extracting energy from a tidal stream in a body of water, the apparatus comprising a line located in a tidal stream, the line comprising a body having a drag surface oriented substantially in the direction of the tidal stream and comprising at least one formation for promoting a drag force on the body to cause movement of the line with the tidal stream; and a generator; wherein the line is coupled to the generator such that movement of the line in the tidal stream drives the generator.

According to a third aspect of the invention, there is provided apparatus for extracting energy from a tidal stream in a body of water, the apparatus comprising: a body located in a tidal stream; a generator coupled to the body; and a line coupled to the generator such that relative movement between the line and the generator drives the generator; wherein the body comprises a drag surface oriented substantially in the direction of the tidal stream and comprising at least one formation for promoting a drag force on the body from the tidal stream to cause movement of the body and the generator relative to the line to drive the generator.

According to a fourth aspect of the invention there is provided apparatus for extracting energy from a tidal stream in a body of water, the apparatus comprising a line located in a tidal stream, the line comprising at least one formation for promoting movement of the line with the tidal stream; and a generator; wherein the line is coupled to the generator such that movement of the line in the tidal stream drives the generator.

Thus the apparatus may use kinetic energy from a tidal stream in a body of water and convert it to mechanical energy of a generator. The line is coupled to the generator such that the kinetic force causes the line to be deployed to a controlled length and the mechanical movement of the line is used to drive the generator.

An important feature of the invention in certain aspects is the provision of a body which defines a drag surface. The drag surface is oriented in the direction of the tidal stream (and may be parallel to the stream) and the drag force which is generated on the body causes it to move in the tidal stream. This is in contrast to previous proposals which use the thrust of the tidal stream to propel sails or other planar members to drive generators. Such proposals rely on fragile components and complex mechanisms. In contrast, embodiments of the present invention allow the use bodies which have substantial volume, and which utilise the surface to harness a drag force to generate movement of the body.

According to a fifth aspect of the invention there is provided a method of extracting energy from a tidal stream in a body of water, the method comprising the steps of:
  providing a generator and a line coupled to the generator such that relative movement between the line and the generator drives the generator;
  providing a body in the tidal stream, the body comprising a drag surface oriented substantially in the direction of the tidal stream and comprising at least one formation for promoting a drag force on the body to cause movement of the body with the tidal stream;
  allowing movement of the body with the tidal stream, such that relative movement of the line and generator drives the generator.

According to a sixth aspect of the invention there is provided a method of extracting energy from a tidal stream in a body of water, the method comprising the steps of:
  providing a line in a tidal stream, the line comprising a body having a drag surface oriented substantially in the direction of the tidal stream and comprising at least one formation for promoting a drag force on the body to cause movement of the line with the tidal stream;
  providing a generator;
  allowing movement of the line and body with the tidal stream, such that movement of the line drives the generator.

According to a seventh aspect of the invention, there is provided a method of extracting energy from a tidal stream in a body of water, the method comprising the steps of: deploying a line in the flowing stream, the line comprising at least one formation to promote movement of the line with the tidal stream;
allowing movement of the line with the tidal stream, such that movement of the line drives a generator.

Embodiments of the fifth, sixth or seventh aspects of the invention may include preferred and optional features of the first to fourth aspects of the invention and vice versa.

According to an eighth aspect of the invention there is provided an apparatus for extracting energy from a tidal stream in a body of water, the apparatus comprising a body located in a tidal stream; a generator; and a line coupled to the generator such that relative movement between the line and the generator drives the generator; wherein the body is substantially tubular and is configured to move in the tidal stream in a longitudinal direction of the body to drive the generator.

A further aspect of the invention relates to a controlled buoyant line deployed in a tidal stream path with the purpose to exert energy from the tidal streams and convey the energy along the line to the plant to drive a generator. A made up line of drag agents is deployed in a tidal stream and connected to the generating plant through feeder lines with the purpose of gaining drag force energy from the water flow on the line causing the line to be drawn out a controlled distance from its connection point. The drag line pulls the feeder line out with the tidal flow across a geared mechanical system which provides continuous energy to the generators during the tide cycle.

Features of various exemplary embodiments of the invention include the following:

The line will be of sufficient design and strength to provide the required drag resistance and hold the force on the line. The drag line can be can be of considerable diameter and be deployed from meters to kilometers along the tidal stream in order to meet the mechanical energy required. The line is connected via the feed lines to a generating plant and the drag energy on the lines is converted to mechanical energy to drive a generator. On the turn of the tide the drag line is drawn in the opposite direction and the process draws the opposite end of the feeder line out a controlled distance. The drag line can be designed to operate to one or more generators and on one or both tidal flows. The drag line is buoyant and harnessed to a specified direction and depth by guide posts fixed to the seabed and or guide rails to take advantage of the tidal stream and avoid the seabed and surface interruption. The drag properties of the line can be enhanced by attaching additional drag agents to the line designed with features to enhance drag and provide additional buoyancy.

The generating plant the feed lines are connected to can be located on land or on offshore platforms or to subsea generating plants. The feed wires are harnessed to and directed by the use of guide posts. The drag line can be deployed in clusters terminating in one or more generating plants. On the return tide the slack end of the system is rewound automatically back to the start point for the next tide by utilising a separate rewind system.

The objective is to extract renewable energy from the tidal streams. The main advantages of the system are its technical simplicity, its ability to utilise available tidal forces to produce clean renewable energy, its expected capital and operating cost being a fraction of current tidal energy proposals, its low carbon footprint, its minimal environmental impact, its minimal seabed or sea surface impact, its lack of visibility and noise. The concept is scalable based on the tide streams available.

The drag lines can be meters to kilometers in length and deployed in clusters of more than one to capture energy from the water movement and transfer that energy along its length to a point where it can be utilised and converted to mechanical energy.

The line is expected to be made up in sections of ten to one hundred meters in length and be of sufficient strength to hold all the forces on the line. Attached or surrounding the core are fitted buoyant tubing sealed with air or foam and an array of design features to provide additional drag on the line and give buoyancy to the line along it length. In order to gain maximum force from a short tidal stream a number of tubing arrays can be attached together on one line. Additional drag can be applied by adding drag agents of different design which can also assist the stability of the system.

The drag lines are maintained above the seabed by their buoyancy and harnessed to elevation posts or to a guide line. The diameter of the drag lines can vary in shape and size and design to meet the underwater conditions and maximise the drag to the force required to provide sufficient mechanical drive to the generator. The underwater drag lines are designed to travel a controlled distance in each direction and the energy gathered dispersed along the line to provide mechanical power to a generator.

The drag lines can be harnessed between the start and end points to elevation posts or to guide lines anchored to the seabed to maintain the drag line on a confined path along the tidal stream and at a minimum height above the seabed and at a specified depth beneath the water surface as required.

The underwater drag line is drawn out by the force of the water stream and the energy gathered is transferred along the line and through the feeder line to a generation unit at the ends of the line and this controlled movement of the line is used to drive a generator. When the tide turns the line moves in the opposite direction and the energy gathered is again transferred along the line to a generation unit and at the same time the opposite end of the line is returned to its original position ready for the next turn of the tide.

The line may be restricted in the length it travels but the force at the generation end is geared to provide continuous mechanical energy during the tide cycle.

On a 'long line system' (FIGS. 1, 7, 8 and 11) there are generating stations at both ends of the line but the captured power is supplied to only one generator at a time. When the tide turns the line is pulled in the opposite direction with the other end of the line connected to a generator. On a 'looped system' (FIG. 10) the start and end point is the same with the feeder lines guided back to a single generating plant. On a 'single directional system' (FIG. 9) the drag effect on one end of the drag line is designed so as to have minimal drag when the current is travelling one way and drag is maximised by design on the other line. When the flow changes in the opposite direction the roles of the drag lines is reversed. The single directional lines are deployed either side of the generating plant.

There is a rewind mechanism on the slack end of the line to rewind the line back to the start for the next turn of the tide.

The concept is expected to be utilised efficiently in most currents with a flow of 1 m/sec or higher such as firths, inlets to large bays or anywhere there is water force with sufficient power to be economically harnessed. The drag lines can vary in length and run from one land mass to another many kilometers away. The gathering point the drag lines are attached to may be onshore, offshore on the seabed or on offshore mini platforms. The concept is scalable to the available potential.

There will now be described, by way of example only, example embodiments of the invention with reference to the following drawings, of which:

FIG. 7 is a schematic view of an apparatus deployed in accordance with an alternative embodiment of the invention;

FIG. 11 is a schematic view of a mounting arrangement in accordance with a further alternative embodiment of the invention;

FIG. 12 is a schematic plan view of an installation in accordance with an alternative embodiment of the invention; and FIG. 13 is a schematic side elevation of a system in accordance with a further alternative embodiment of the invention.

Figure 1:
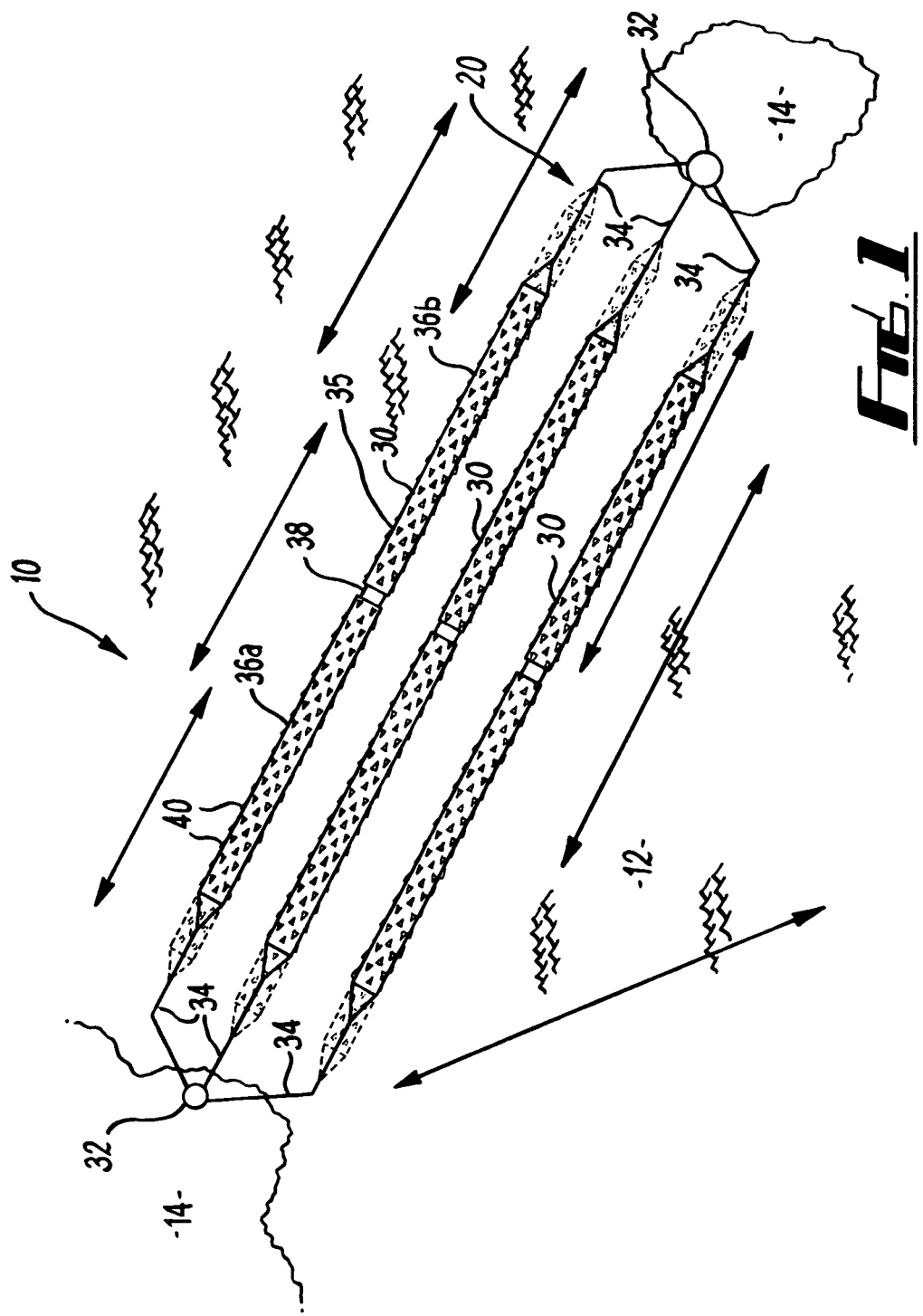
FIG. 1 is a schematic, plan view of an apparatus in accordance with a first embodiment of the invention.

Referring firstly to FIG. 1, there is shown an installation, generally depicted at 10, comprising the apparatus 20 in accordance with an embodiment of the invention. The installation is shown in plan view, deployed in a body of water 12 between land masses 14. The body of water is located in a tidal stream, with the direction of the tide indicated by the arrows. The apparatus comprises multiple lines 30, coupled to generator plants 32 at each of their opposing ends. The lines 30 are tethered to the generator plants 32 by feed lines 34. Three lines 30 are provided in this embodiment, although it will be appreciated that other numbers and configurations of lines may be used. Each line 30 in this example has approximate dimensions of 1 meter diameter and 300 meters in length.

The generator 32 is one that converts mechanical rotational energy into electrical energy. The generator comprises a rotor which is tethered to the feed line, such that linear motion of the feed line causes rotation of the rotor and generation of electrical energy. The generator may be an induction generator or a synchronous generator. The generator plant also includes a suitable gearing system for controlling the energy generation cycle. A rewind mechanism is operable to wind-in the feed line.

Figure 2:
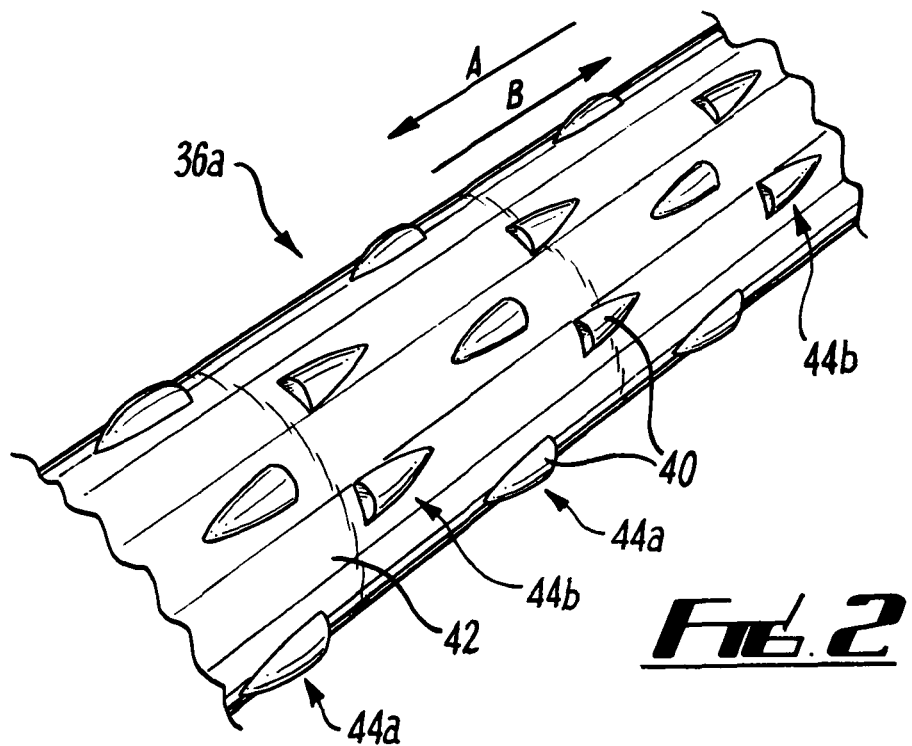
FIG. 2 is a perspective view of a portion of the line of FIG. 1 showing drag elements.

Each line 30 comprises a body 35 made up of multiple line sections 36a, 36b. In this embodiment, the sections 36a, 36a are plastic moulded tubular sections joined by connectors 38. The line sections 36a, 36b are selected to be positively buoyant in sea water. The outer surface of the body 35 is provided with formations or drag elements 40 which promote movement of the line 30 in the tidal stream. FIG. 2 shows a portion of a line section 36a in more detail. The drag elements 40 are solid protrusions moulded with the section 36a, upstanding from the main surface 42 of the section. Drag elements 40 are distributed longitudinally and circumferentially on the section 36a. In this embodiment, the drag elements 40 are formed in a series of longitudinally separated rings 44a, 44b. The drag elements 40 are directional, with the elements in ring 44a oriented in an opposing direction from the drag elements in adjacent ring 44b.

The drag elements 40 are profiled to provide a low drag coefficient in one direction and a relatively high drag coefficient in the other direction. In this embodiment, the drag elements 40 have a first sheer face 46 which faces one longitudinal direction of the line 30 and a second, gradually inclined face 47 which faces an opposing longitudinal direction. In this embodiment, the gradually inclined face 47 is in the form of a parabolic cone, although other shapes and designs fall within the scope of the invention. Ring 44a of drag elements 40 therefore provides maximum drag against fluid flow moving in the direction of the arrow A, whereas ring 44b of drag elements 40 has maximum drag against fluid flow moving in the direction of arrow B.

In use, the apparatus 20 is installed in a tidal stream as shown in FIG. 1. The tidal stream moving in a first direction imparts a force on to the lines 30, which is promoted by the presence of the formations or drag elements 40. The force acts on the line 30 to cause it to move in a linear direction away from the upstream generator plant 32. The corresponding feed line of 34 is pulled out from the upstream generator imparting rotational movement to the rotor, which is converted to electrical energy. While the feed line 34 at the upstream end of the line 30 is pulled out, the feed line 34 at the opposing downstream end of the line 30 slackens. A rewind mechanism in the downstream generator plant takes up the slack in the feed line 34 to coil the feed line around the rotor. The feed line 34 is allowed to pay out to an extent appropriate to the dimensions of the line 30 and the body of water in which it is located.

When tide changes to move in an opposing direction, the line 30 moves in the opposing direction and the feed line is pulled out from the (previously downstream but now upstream) generator plant 32. A rewind mechanism in the now downstream generator plant 32 takes up the slack in the feed line at the downstream end of the line 30. The apparatus of the invention is therefore operable to generate electrical energy through both tidal phases.

It will be understood by one skilled in the art that the formations or drag elements 40 may vary in different embodiments of the invention, and example embodiments are illustrated with reference to FIGS. 3 to 6 of the drawings.

Figure 3A:
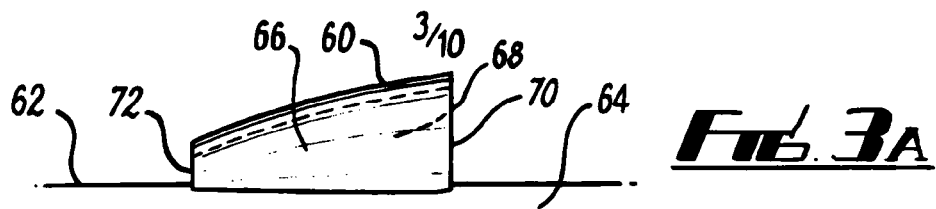
FIGS. 3A and 3B are respectively side and end on views of drag elements in accordance with an alternative embodiment of the invention.
Figure 3B:
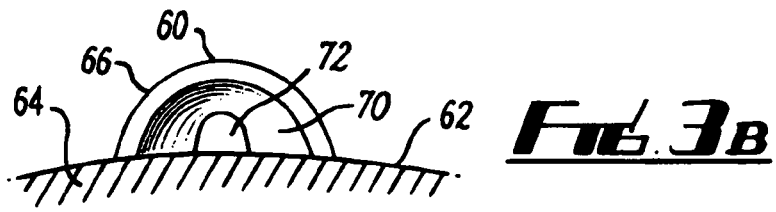

FIG. 3A is a side view and FIG. 3B is an end view of a drag element 60 according to one embodiment. The drag element 60 is upstanding from a surface 62 of the line section 64. The drag element 60 is formed from a plastic material and may be moulded with the section 64. The drag element 60 comprises a gradually inclined surface 66 which defines an internal volume 68 having an inlet 70 and an outlet 72. The outlet 72 provides a restricted flow path for fluid passing through the element. The drag element 60 functions as a funnel in use, with water flowing into the inlet 70 and the outlet 72. The inner surface of the drag element experiences a force due to the tidal stream which is transferred to a linear movement of the line. By providing a funnel-type drag element, the stability of the system may be improved with respect to the solid drag element shown in FIGS. 1 and 2.

Figure 4:
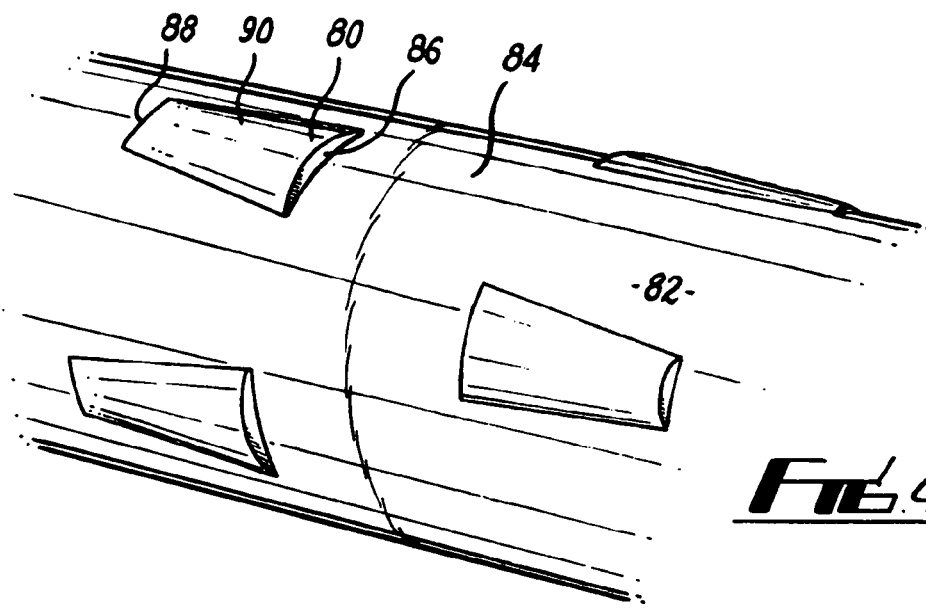
FIG. 4 is a perspective view of a line in accordance with a further embodiment of the invention.
Figure 5:
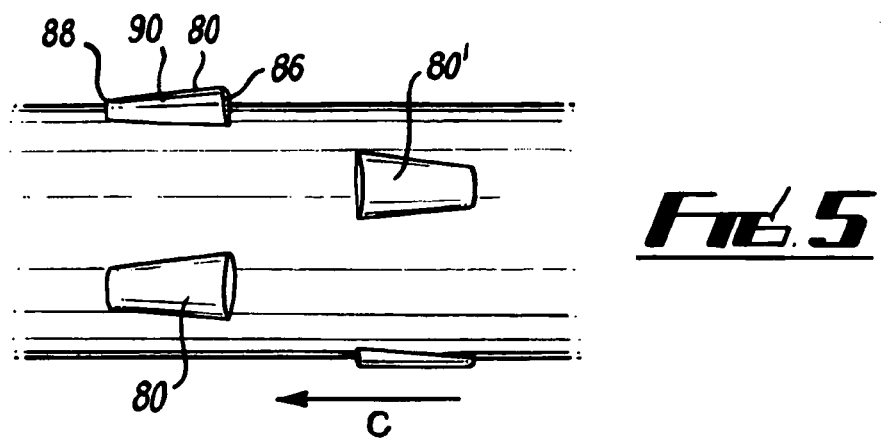
FIG. 5 is a side view of the embodiment of FIG. 4 in use.

FIG. 4 shows an alternative embodiment, in which the drag elements 80 are flexible or collapsible to the surface 82 of the line section 84. In a similar manner to the embodiment of FIG. 3, the drag element comprises an inlet 86 and an outlet 88. The outlet 88 provides a restricted flow path for fluid. However, the outer surface 90 is formed from a flexible material, such as a plastic sheet material, which is collapsible against the surface 82. FIG. 5 shows the embodiment of FIG. 4 in use in a fluid stream. Fluid moving in the direction of the arrow C enters the inlet 86 which tends to inflate the drag element 80 to create an inner drag surface for the line. Fluid passes out of the outlet 88. However, drag elements 80' oriented in the opposing direction do not tend to inflate due to the relatively small flow area of the outlet which faces the fluid stream C.

Figure 6:
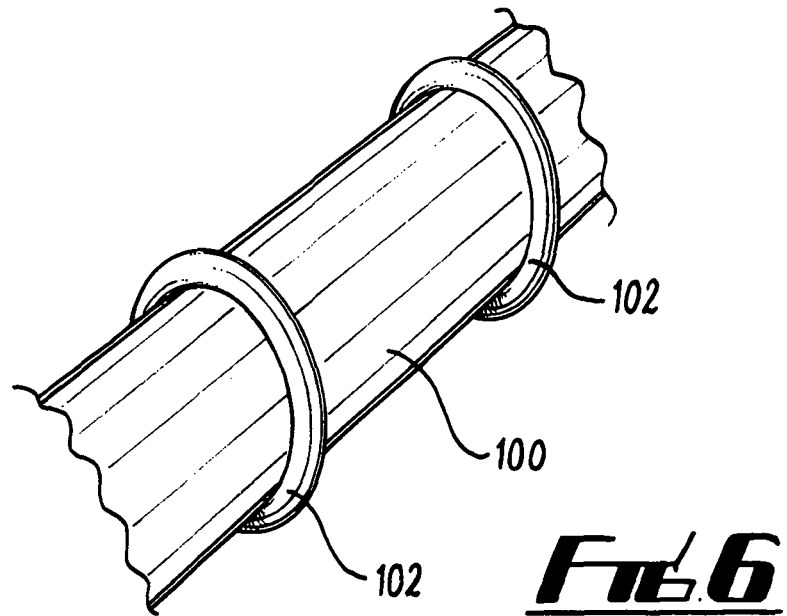
FIG. 6 is a perspective view of a line in accordance with a further alternative embodiment of the invention.

FIG. 6 is a further alternative embodiment of the invention, in which the drag elements consist of annular rings axially separated along the length of the line or a tube section. In this embodiment, the annular rings are not directional, and are symmetrical in a longitudinal direction of the line.

Other configurations of drag element can be used. For example, the drag element may comprise upstanding formations or recessed channels which increase the drag coefficient of the line in a moving fluid. The drag element may comprise flexible members upstanding from the body. For example, arrangements of bristles or fins may be provided on the body. In alternative embodiments, the surface of the body and/or the drag elements may be provided with a roughened or textured surface. In another embodiment, lengths (for example 1 meter) of cotton rope may be attached on the body in order to increase drag.

In the embodiments of FIGS. 1 to 6, the line comprises a tubing body 35 attached to a separate feed line. However, in an alternative embodiment, the line is integrally formed with the feed line. For example, the feed line may be provided with formations, which may simply be knots in a line extending the length of the line. In other embodiments, the feed line may constitute a core of the line 30, and one or more outer bodies are located on the feed line along its length. The purpose of body or bodies is to increase the resistance of the apparatus in the tidal stream and convey the energy to the line and convert it to mechanical energy to drive the generators.

The embodiment of FIG. 1 comprises a line 30 formed from two line sections 36a, 36b. In preferred embodiments of the invention, the line sections are selected from a system of interchangeable modular components. This facilitates construction and installation of an energy extraction system which suits a particular geographical location. Multiple line sections, for example of length approximately 5 meters to 20 meters may be assembled to form a line string of length up to several kilometers in length. By assembling the line from modular components, a scalable system is provided which has reduced manufacturing, storage, and transportation costs, and is scalable to a large number of different locations. The modular system may include dedicated end line sections which are configured for coupling to the generators via feed lines or other tethering arrangements; middle line sections which are configured to be coupled to the dedicated end line sections or another of the middle sections; and connectors which are configured to secure the dedicated end line sections and/or the middle sections to one another.

There will now be described various installations of the apparatus in accordance with alternative embodiments of the invention. FIG. 7 shows an installation, generally depicted at 110, which includes a line 130 similar to the line 30 shown in FIGS. 1 and 2. The line is coupled to first and second generator plants 132 at its opposing ends, and is operable to move in a tidal stream in a linear direction of the line 130 to drive the generators. In this embodiment, feed lines 134 are coupled to mounting structures 140, which function to support the line 130 in an elevated position above the sea bed 142. The mounting structures 140 each comprise a base section 144 on the sea bed and a supporting frame 146 mounted on the base section. The feed lines 134 pass through a pulley system 148 on the mounting structure 140. The mounting structure therefore supports the line within a required range of elevations above the seabed and a minimum depth beneath the water surface, but it still allows linear movement of the line 130 in order to drive the generators.

Figure 8:
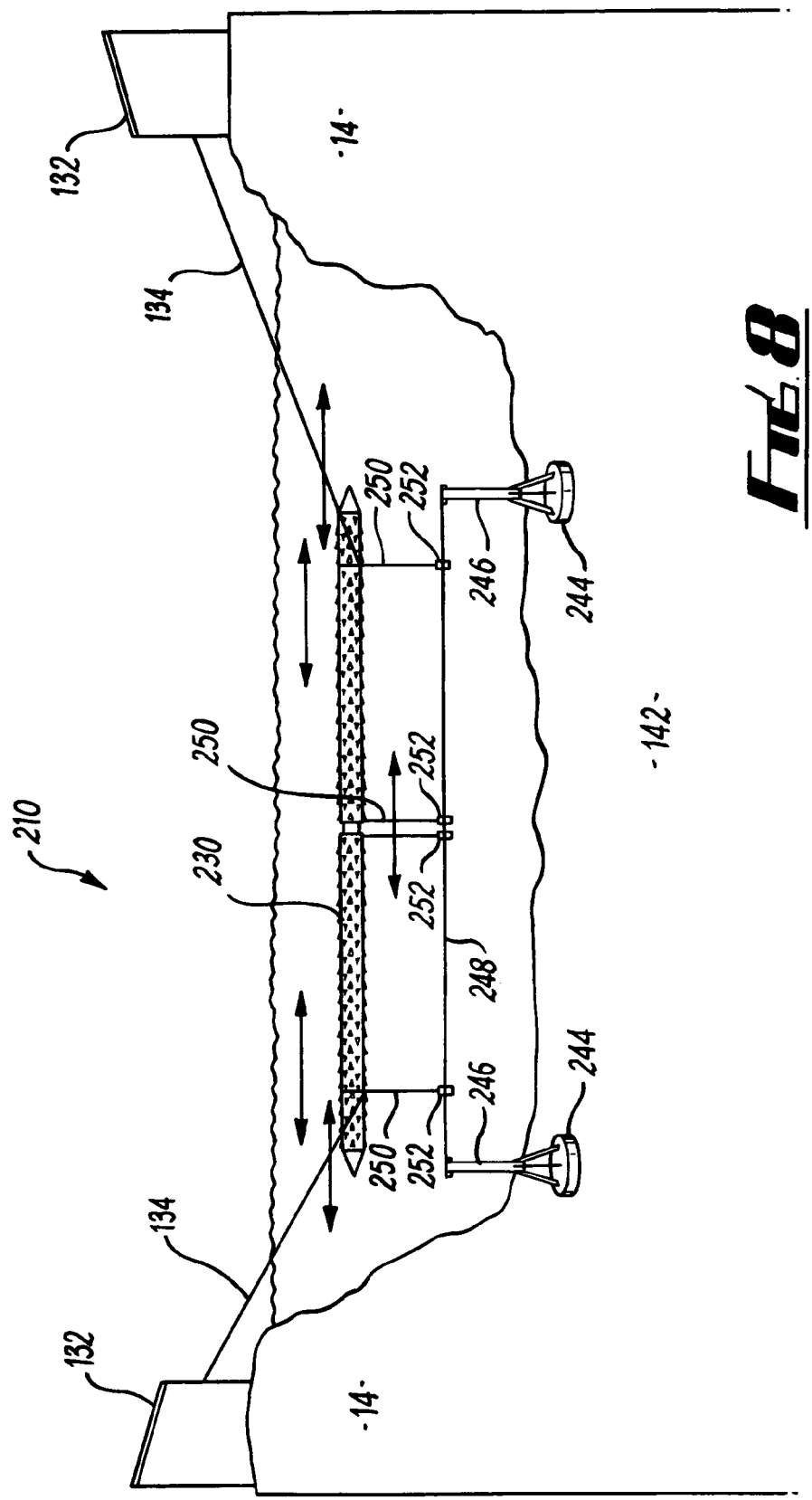
FIG. 8 is a schematic view of an apparatus deployed in accordance with an alternative embodiment of the invention.

FIG. 8 shows an alternative installation 210, which is similar to the installation of FIG. 7, having a mounting structure 160 which supports the elevation of the line 230 within a desired range. However, in this embodiment, the support frames 246 themselves do not define the elevation of the line 230. Instead, the support frames 246 support a guide line 248 which extends through the body of water. The line 230 is tethered to the guide line by a harness system comprising harness lines 250 and harness pulleys 252. The harness pulleys 252 are free to move along the length of the guide line 248. The line 230 is positively buoyant and the height above the guide line 248 (and thus the seabed) is defined by the length of the harness lines 250.

The embodiment of FIG. 8 has the advantage of a controlled depth of the line within the body of water, but without a reliance on large support frames. The effective height of the support frames in the embodiment of FIG. 8 is supplemented by the harness line system. This reduces the capital cost of the mounting structure and increases its ease of deployment. The guide line also functions to confine the movement of the apparatus within a specified directional path.

Figure 9:
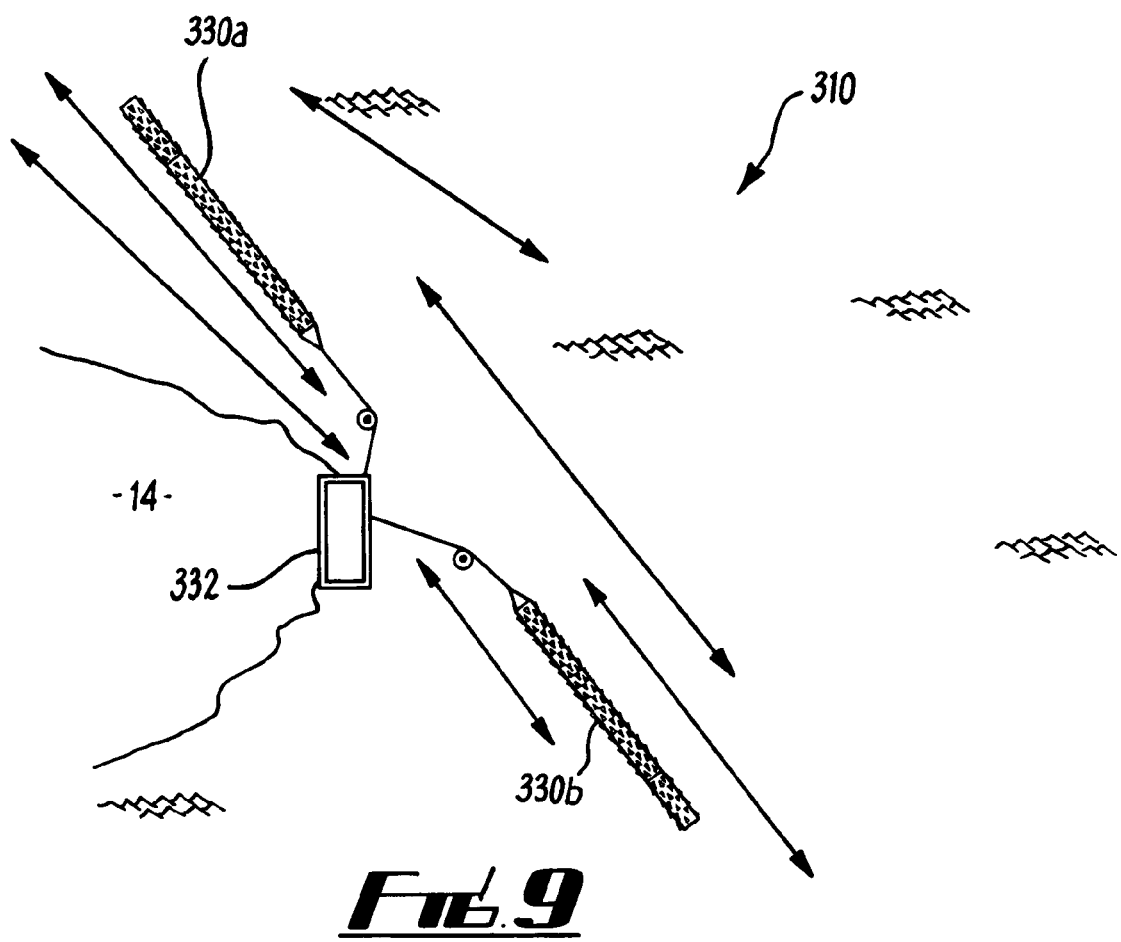
FIG. 9 is a schematic view of an apparatus deployed in accordance with an alternative embodiment of the invention.

FIG. 9 is a plan view of an installation 310 of a further alternative embodiment of the invention, in which two lines 330a, 330b are oriented in opposing directions. The lines 330a, 330b in this embodiment differ from those in the previous embodiments, in that each is are operable to drive a generator only during one of the tide phases. The line 330a comprises formations or drag elements which are designed to have minimal drag when the current is flowing in one direction and maximum drag when the current flows in an opposing direction. The second line 330b has drag elements oriented in an opposing direction. Thus in a first tidal stream direction, the lines 330a is pulled out to drive the generator, and the other line 330b is slackened and its respective feed line is retracted. When the tide changes and the stream is in the opposing direction, the feed line 330b is pulled out to drive the generator and line 330a is retracted.

Figure 10:
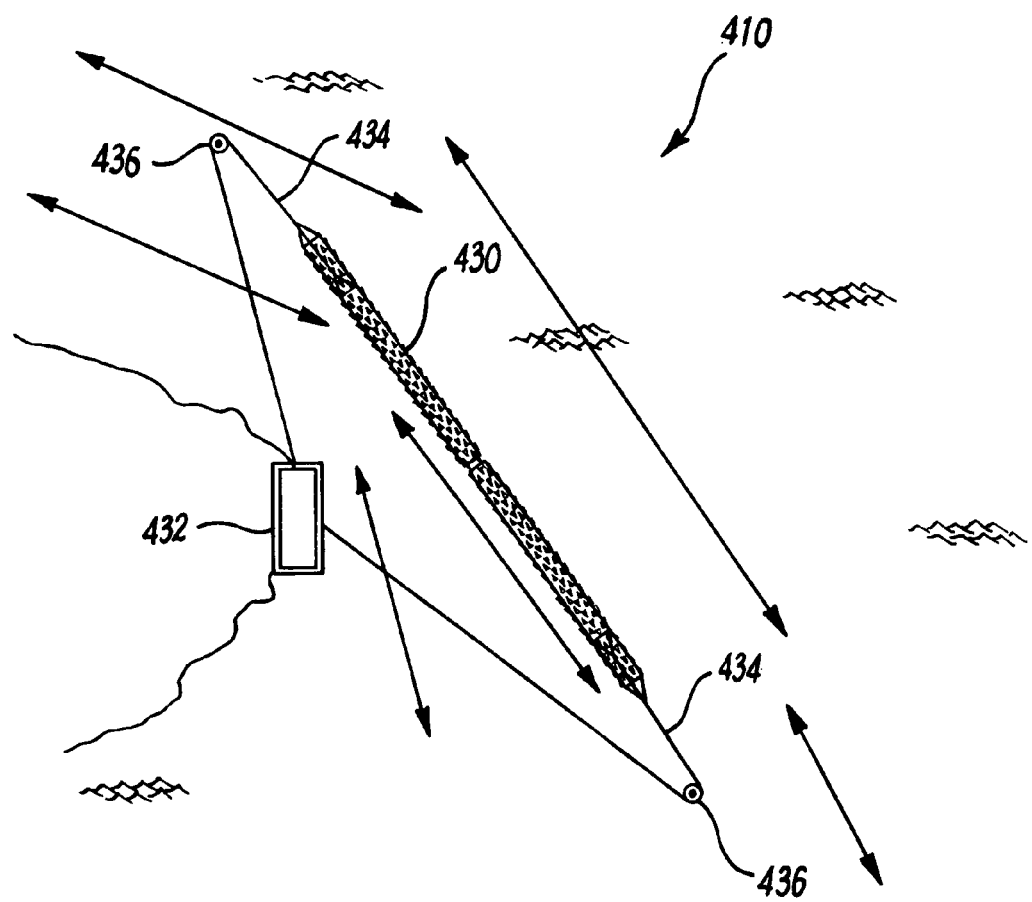
FIG. 10 is a schematic view of an apparatus deployed in accordance with an alternative embodiment of the invention.

FIG. 10 shows an installation 410 in accordance with a further alternative embodiment of the invention, in which the line 430 is coupled at either end to a pulley system 436 which directs its feed line 434 to a single generator plant 432. During the tide cycle, the line 430 reciprocates between the pulley points 436 to drive the generator plant. This system may be effective where it is not possible to install two generator plants at opposing ends of a line.

FIG. 11 shows schematically an alternative installation 510 in sectional view. The line 530 is mounted to a generator plant 532 inside a subsea installation 520. The subsea installation 520 includes a cross-sectional profile of relatively low drag so as to not create turbulence in the tidal stream which may adversely affect operation of the line 530. The subsea installation 520 includes a suction anchor system to mount the installation to the seabed.

In the above-described embodiments, the apparatus is deployed substantially linearly with the tidal stream. However, FIG. 12 shows an alternative installation 610 in which the line 630 is oriented transversely to the tidal stream D. The line 630 moves in a direction d inclined or perpendicular to its longitudinal axis, and is pulled outwards from two generator plants 632 at opposing ends of the line. The line 630 moves within a confined area 634 (shown by the dashed line) when the tidal stream is in the direction D, and is retracted during the slack or opposing tidal phase. In the opposing tidal phase the line moves into the area 636 and pulls out the line from the generators 632.

FIG. 13 shows an alternative installation, generally shown at 700, which also operates on the principle of drag forces from tidal currents causing relative movement between a line and generator system. However, in this embodiment, the apparatus is configured as a movable generator system coupled to a fixed line.

The system 700 comprises a semisubmersible modular vessel 702, comprising a platform 704 located above the sea surface 706, a submerged hull 708, and a support structure 710 which connects the platform 704 to the hull 708.

The hull 708 comprises an internal system of buoyancy control tanks for ballasting and de-ballasting the vessel 702 by flooding with sea water in order to control its draught. The system is designed such that the platform 704 is located above the wave zone and the hull 708 is located at a depth beneath the wave zone. An advantage of this configuration is that the hull 708 is located beneath the surface and avoids exposure to the wind. However, the effects of the wind can be harnessed by including an optional wind turbine 710 located on the platform, which can supplement the energy extraction from the tidal stream.

The hull 708 has a substantial volume which defines a drag surface 712 oriented substantially in the direction of the tidal flow 713. The drag surface 712 is provided with drag elements 714, in a similar fashion to the bodies 30 of FIGS. 1 and 2.

The vessel is provided with a generator system, shown generally at 715, which includes drive wheels 716 located on the hull 708, and which are coupled to a subsea line 718 fixed between two anchor points (not shown). The drive wheels 716 are coupled to the line such that relative movement between the vessel 702 and the line causes rotation of the drive wheels. In this embodiment, two drive wheels are provided, but a single drive wheel or a greater number of drive wheels can be provided in alternative embodiments.

The drive wheels 716 are mechanically coupled to generator units 720 located on the platform, which in turn are coupled to an energy storage system. In this embodiment, the drive wheels 716 are coupled to the generator units via drive shafts 722 and gear mechanisms 724.

The energy storage system of this embodiment comprises electrolysis units (not shown) and hydrogen gas storage tanks 728. The generator units 720 convert mechanical energy to electrical energy to power the electrolysis of water to create hydrogen, which is stored in hydrogen storage tanks 728 located on the platform. It will be appreciated that this is just one method of converting and storing energy generated by the apparatus, and other methods may be used in alternative embodiments. For example, the apparatus could operate a compressed air or gas energy storage system, or in another embodiment the apparatus could include a transmission line for transmission of electrical energy to a remote storage system or transmission grid, for example via power export line 730.

The embodiment of FIG. 13 may be particularly suitable for operation in slow tidal streams, i.e. in the range of 0.1 to 3 m/s.

In the embodiments of FIGS. 1 to 6, the line comprises a tubing body 35 attached to a separate feed line. However, in an alternative embodiment, the line is integrally formed with the feed line. For example, the feed line may be provided with formations, which may simply be knots in a line extending the length of the line. In other embodiments, the feed line may constitute a core of the line 30, and one or more outer bodies are located on the feed line along its length. The purpose of body or bodies is to increase the resistance of the apparatus in the tidal stream and convey the energy to the line and convert it to mechanical energy to drive the generators.

A further embodiment of the invention comprises a line formed from an inner core of plaid synthetic rope of up to approximately 0.5 meters in diameter. Attached to and surrounding the rope core is a foam sponge material that would increase the diameter of the line to an appropriate size to meet the drag engineering requirements. The sponge element absorbs water to give the line additional density, drag and buoyancy with reduced cost, limits the environmental impact and increases safety and recovery benefits.

In an alternative embodiment of the invention (not illustrated), the drag elements on the line are not continuous throughout the operating length of the line. For example, there may be portions of the line with substantially low drag intermediate between portions of the line which comprise the formations or drag elements to promote drag forces. In one example, the apparatus consists of a series of buoys tethered together in a line, with the profile of the buoys providing the drag forces. In one specific embodiment, the line is formed from a feed line, which is effectively continuous through the length of the line, and which has line sections with drag elements clamped on to the feed line.

Electrical energy generated by embodiments of the invention could be connected to a grid system, or alternatively could be used locally to the installation. For example, the electrical energy could be used to store energy in another form, such as by electrolysis. Alternatively, the energy could be used directly to provide power for domestic or industrial use.

This invention relates to the controlled deployment of a buoyant line in a tidal stream path in order to exert tidal energy on the line which is conveyed along the line and used as mechanical energy to drive a generator. The opposite end of the line is rewound mechanically to its original start position on each turn of the tide ready for the process to repeat. In embodiments of the invention, the deployed lines may be confined within specified parameters of elevation above the seabed and depth beneath the water surface. The direction of orientation and movement may be confined by being harnessed to guide posts, wires and/or rails. The modular construction and buoyancy of the lines assist in the operational management and maintenance of the lines, and improve ease of recovery.

The invention provides an apparatus and method for extracting energy for a tidal stream in a body of the water. The apparatus comprises a body located in a tidal stream, a generator; and a line coupled to the generator such that relative movement between the line and the generator drives the generator. In one configuration, the body comprises a drag surface oriented substantially in the direction of the tidal stream and has at least one formation for promoting a drag force on the body. The drag force causes movement of the body with the tidal stream, which results in relative movement of the line and generator to drive the generator.

In one embodiment, the apparatus comprises a line located in a tidal stream, the line comprising at least one formation which promotes movement of the line with the tidal stream. The line is coupled to a generator such that movement of the line of the tidal stream drives the generator. The present invention and its embodiments provide an alternative energy extraction system for use in tidal streams which has low environmental impact, is simple to manufacture and deploy, requires little supporting infrastructure, and which can be installed in a variety of subsea locations.

Combinations of features other than those expressly claimed are within the scope of the invention.

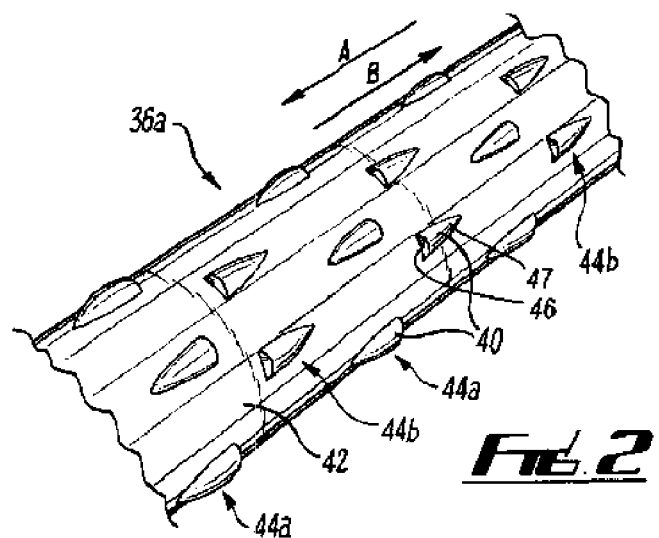

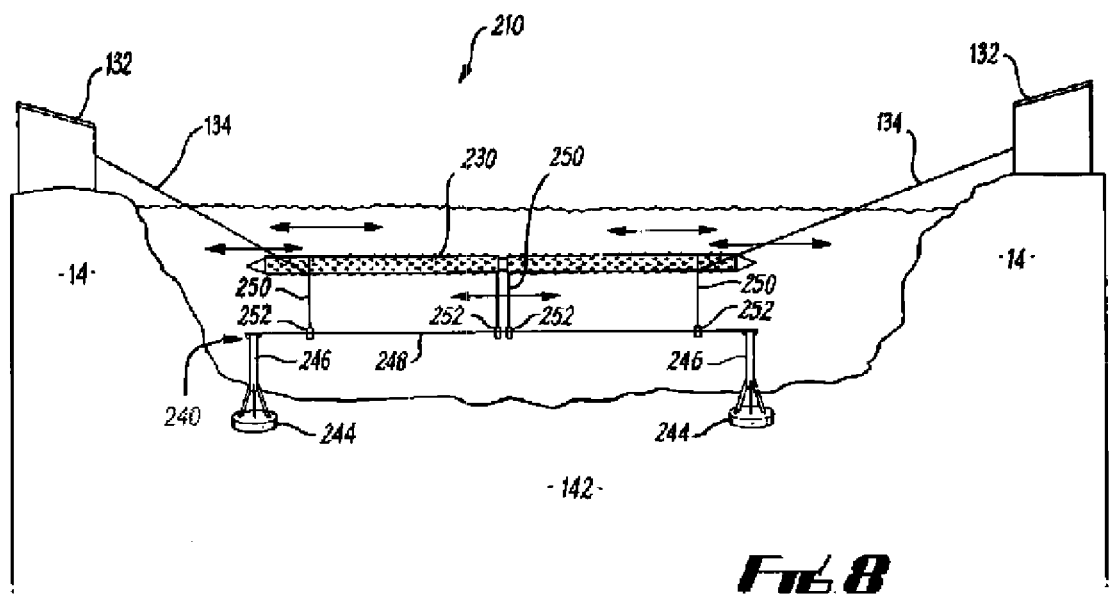

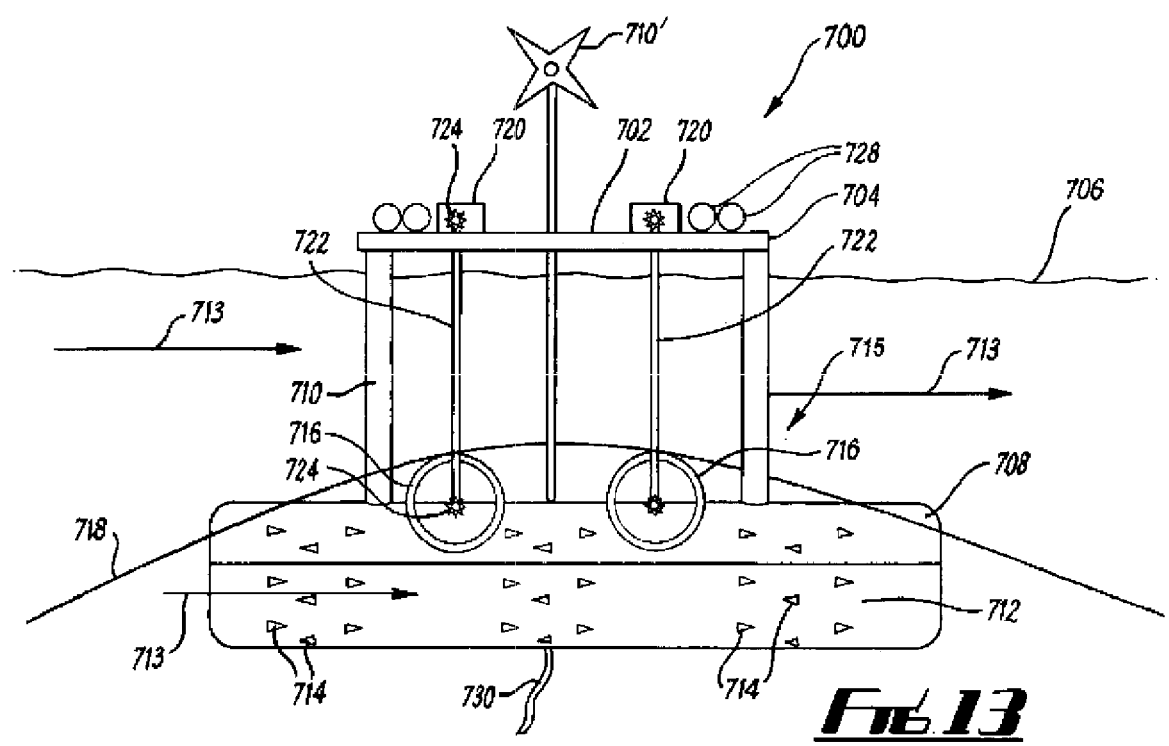

The invention claimed is:

1. Apparatus for extracting energy from a tidal stream in a body of water, the tidal stream having a direction, the apparatus comprising:
   a body located in the tidal stream, the body comprising first and second terminal ends joined by a middle portion, the middle portion comprising a drag surface oriented substantially parallel to, and extending in the direction of the tidal stream such that the drag surface is configured to harness a drag force to generate movement of the body in the direction of the tidal stream, the drag surface comprising at least one formation extending radially therefrom for promoting movement of the body in the direction of the tidal stream;
   a generator coupled to the body; and
   a line coupled to the body and to the generator such that relative movement between the line and the generator drives the generator, and wherein the movement of the body in the direction of the tidal stream causes the relative movement between the line and the generator to drive the generator.

2. The apparatus as claimed in claim 1, wherein the at least one formation comprises a surface for promoting the drag force on the body to cause longitudinal movement of the body in the direction of the tidal stream.

3. The apparatus as claimed in claim 1, wherein the body is fixed relative to the line, and the body and line move in the tidal stream.

4. The apparatus as claimed in claim 1, wherein the body is fixed relative to the generator, and the body and generator move in the tidal stream.

5. The apparatus as claimed in claim 1, wherein the body comprises multiple formations distributed along the length of the line.

6. The apparatus as claimed in claim 1, wherein the at least one formation is a part of a drag element disposed on the body.

7. The apparatus as claimed in claim 6, wherein the drag element defines a fluid flow path therethrough such that fluid flowing in the direction of the tidal stream passes into a first opening of the drag element, through the fluid flow path, and out a second opening of the drag element, wherein the first opening is larger than the second opening.

8. The apparatus as claimed in claim 7, wherein the fluid flow path has an open configuration and a closed configuration.

9. The apparatus as claimed in claim 1, wherein the at least one formation is directionally configured such that a maximal drag force is exerted on the body when the tidal stream has a current in a first direction during a first tidal phase, and a minimal drag force is exerted on the body when the tidal stream has a current in an opposite direction during a second tidal phase.

10. The apparatus as claimed in claim 1, wherein the at least one formation is configured to promote movement of the line in a substantially longitudinal direction of the line.

11. The apparatus as claimed in claim 1, wherein at least one formation is configured to promote movement of the body with the tidal stream in a first direction, and at least one further formation is configured to promote movement of the line with the tidal stream in a second direction.

12. The apparatus as claimed in claim 1, wherein the at least one formation is configured to promote movement of the line with the tidal stream in a first direction of the tidal stream and in a second direction of the tidal stream.

13. The apparatus as claimed in claim 1, wherein the body is positively buoyant.

14. The apparatus as claimed in claim 1, wherein the body is substantially tubular.

15. The apparatus as claimed in claim 1, further comprising a plurality of body sections joined together to form the body, wherein each body section respectively comprises first and second terminal ends joined by a middle portion, and wherein the first terminal end of a first body sections is joined with the second terminal end of a second body section.

16. The apparatus as claimed in claim 15, wherein the plurality of body sections is part of a modular system of components.

17. The apparatus as claimed in claim 1, further comprising a plurality of lines deployed in an array.

18. The apparatus as claimed in claim 1, further comprising a support structure for supporting the line above a seabed.

19. The apparatus as claimed in claim 18, wherein the support structure comprises at least one frame attached to or located on the seabed.

20. The apparatus as claimed in claim 19, wherein the support structure comprises a guide supported by the at least one frame located on the seabed, wherein the line is harnessed to and moveable on the guide such that the movement of the body with the tidal stream is facilitated by the engagement of the line with the guide.

21. The apparatus as claimed in claim 1, wherein the generator comprises a mechanism for retracting a part of the line.

22. The apparatus as claimed in claim 1, wherein the line is coupled to a terminal end of the body.

23. A method of extracting energy from a tidal stream in a body of water, the tidal stream having a direction, the method comprising the steps of:
   providing a generator and a line coupled to the generator such that relative movement between the line and the generator drives the generator;
   providing a body in the tidal stream, wherein the body is coupled to the line, the body comprising first and second terminal ends joined by a middle portion, the middle portion comprising a drag surface oriented substantially parallel to, and extending in the direction of the tidal stream such that the drag surface is configured to harness a drag force to generate movement of the body in the direction of the tidal stream, the drag surface comprising at least one formation extending radially therefrom for promoting movement of the body in the direction of the tidal stream, wherein the movement of the body in the direction of the tidal stream during a first tidal phase causes relative movement between the line and the generator to drive the generator; and
   allowing movement of the body in the direction of the tidal stream, such that the relative movement between the line and the generator drives the generator.

24. The method as claimed in claim 23, further comprising the steps of feeding out a feed line to allow the line to move with and in the direction of the tidal stream during the first tidal phase to drive the generator, and retracting the feed line during a second opposing tidal phase.

25. The method as claimed in claim 24, further comprising driving a generator during the second opposing tidal phase.

26. The method as claimed in claim 25, further comprising driving a second generator during the second tidal phase.

27. The method as claimed in claim 25, further comprising driving a generator during the first and second tidal phases using the same line.

28. The method as claimed in claim 25, further comprising driving a generator during the first and second tidal phases using the same body.

29. The method as claimed in claim 23, wherein the at least one formation defines a fluid flow path therethrough, the method further comprising allowing fluid flowing in the direction of the tidal stream to pass into a first opening of the formation, through the fluid flow path, and out a second opening of the formation, wherein the first opening is larger than the second opening.

* * * * *

UNITED STATES PATENT AND TRADEMARK OFFICE
CERTIFICATE OF CORRECTION

Page 1 of 4

PATENT NO.        : 8,851,837 B2
APPLICATION NO.   : 13/054163
DATED             : October 7, 2014
INVENTOR(S)       : Whitelaw It is certified that error appears in the above-identified patent and that said Letters Patent is hereby corrected as shown below:

In the Drawings

Fig. 2, insert --sheer face 46-- (See attached sheet)
Fig. 2, insert --inclined face 47--

Fig. 8, insert --mounting structure 240-- (See attached sheet)

Fig. 13, insert --generator system 715-- (See attached sheet)

In the Specification

Column 2
Line 39, change "use bodies" to --use of bodies--

Column 5
Line 58, change "36a, 36a," to --36a, 36b--

Column 8
Line 8, change "mounting structure 160" to --mounting structure 240--

Signed and Sealed this
Second Day of August, 2016

Michelle K. Lee
*Director of the United States Patent and Trademark Office*